Oct. 16, 1934.　　　C. S. LINDER　　　1,976,949

GLASS TANK CONSTRUCTION

Filed March 17, 1933　　2 Sheets-Sheet 1

INVENTOR
CYRIL S. LINDER.
BY Bradley + Bee
ATTORNEYS

Oct. 16, 1934.    C. S. LINDER    1,976,949
GLASS TANK CONSTRUCTION
Filed March 17, 1933    2 Sheets-Sheet 2

INVENTOR
Cyril S. Linder
BY Bradley & Coe
ATTORNEYS

Patented Oct. 16, 1934

1,976,949

UNITED STATES PATENT OFFICE 1,976,949

GLASS TANK CONSTRUCTION

Cyril S. Linder, Elwood, Ind., assignor to Pittsburgh Plate Glass Company, a corporation of Pennsylvania Application March 17, 1933, Serial No. 661,302

4 Claims. (Cl. 49—54)

Figure 1:
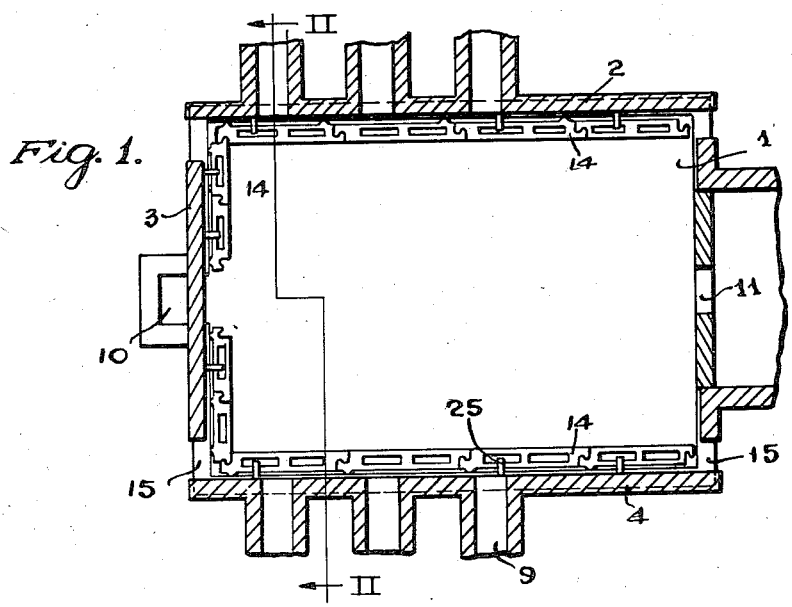
Figure 2:
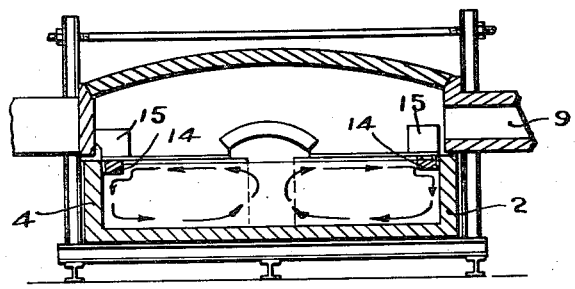
Figure 4:
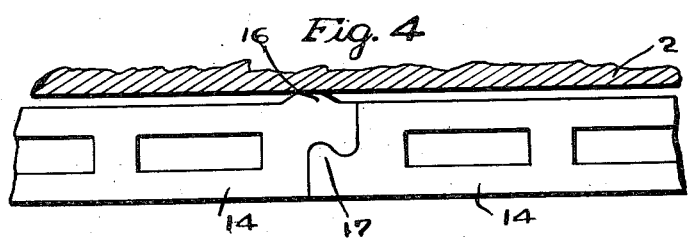
Figure 5:
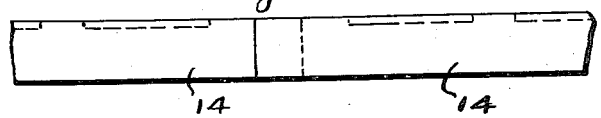
Figure 3:
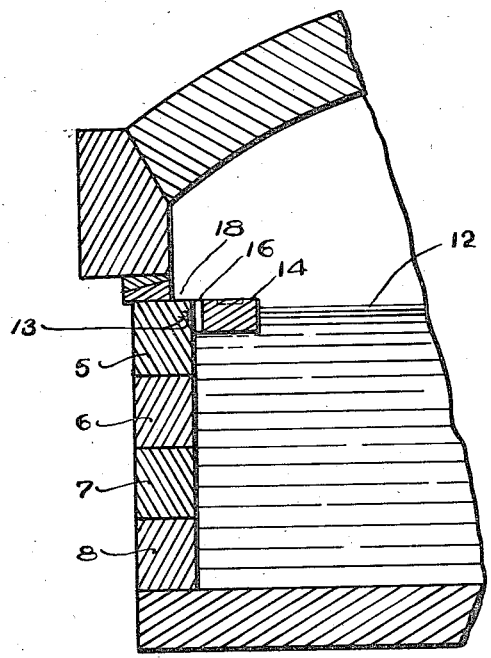
Figure 6:
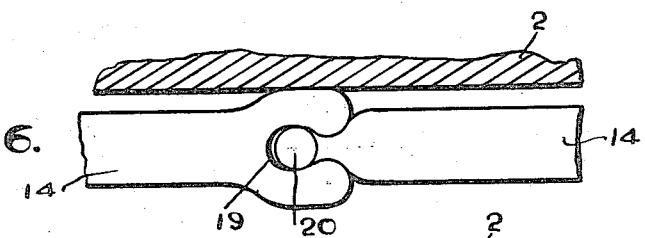
Figure 7:
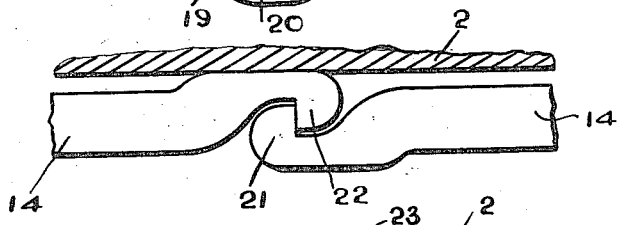
Figure 8:
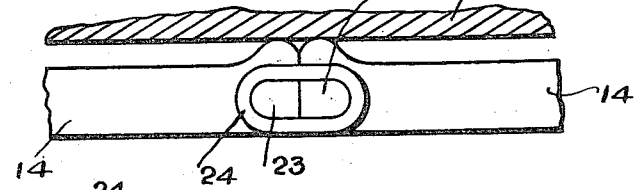
Figure 9:
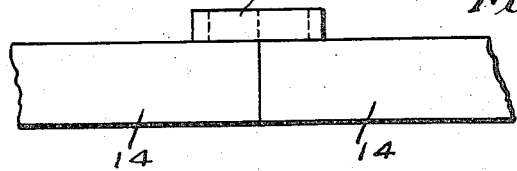

The invention relates to glass melting tanks and particularly to a means for reducing the cost of maintenance of such tanks. Due to the corrosive and erosive action of the molten glass and to heat conditions present in tanks as now constructed, the top row of blocks making up the side walls of the tank is eaten away and requires replacement at relatively frequent intervals. This replacement calls for an interruption of the operation of the tank and aside from the cost of replacement, involves a serious loss in the productive capacity of the tank. The object of the present invention is to provide improved means for protecting the upper row of blocks so that their life will be comparable to the life of the body of the tank and thus avoid the loss incident to frequent shut downs for repairs. Briefly stated, this is accomplished by the use of renewable floaters which are supported in the glass bath along the side wall of the tank at the level of the bath and which largely protect the top row of tank blocks from the corrosive and erosive action of the molten glass. The invention involves a carrying forward of the principle disclosed in the patent to Baudoux and Gobbe No. 549,427 and relates to certain details of improvement shown in the accompanying drawings, wherein:

Figure 1 is a horizontal section through the tank above the level of the glass. Fig. 2 is a vertical section on the line II—II of Fig. 1. Fig. 3 is an enlarged partial vertical section through the tank on the line II—II of Fig. 1. Figs. 4 and 5 are enlarged detail views, Fig. 4 being a plan view and Fig. 5 a side elevation. Figs. 6 and 7 are plan views showing modifications. And Figs. 8 and 9 illustrate another modification, Fig. 8 being a plan view and Fig. 9 a side elevation.

Referring to Figs. 1 and 2, 1 is a glass melting tank of ordinary construction having the walls 2, 3 and 4 made up of courses of clay blocks 5, 6, 7 and 8 as illustrated on a large scale in Fig. 3, the blocks 5 constituting the top row. The tank is provided with the usual regenerator flues 9 and a withdrawing opening 10 at its front end, batch being fed into the rear end 11 of the furnace in the usual way.

Reference numeral 12 indicates the level of the glass which approaches rather closely to the level of the tops of the upper row of blocks 5. In a normal operation of the tank, the blocks 5 are eaten away at the point 13 due to the chemical activity of the batch at the surface of the glass and to the erosive action of the glass in which convection currents are set up toward the side walls as indicated by the arrows in Fig. 2. If the blocks are not protected at this point, they are eaten away quite rapidly requiring a shut down of the furnace and a replacement of the top row of blocks 5, while the lower rows of blocks 6, 7 and 8 are still in good condition as heretofore explained. The invention here relates particularly to the floaters 14 which are placed end to end along the walls 2, 3 and 4, as indicated in Fig. 1. Openings 15, 15 are provided through the walls at the ends of the tank just above the level of the glass in order to permit of the ready insertion and removal of the floaters, such openings being closed during the operation of the tank with suitable blocks.

There is a tendency of the floaters to stick or weld to the top row of blocks 5, after the floaters have been in position some time, making their removal difficult and in order to overcome this difficulty, the floaters are provided with spaced lugs or projections 16 adjacent their upper edges so that the main body portions of the floaters are maintained out of contact with the blocks 5, as indicated in Figs. 3 and 4. In order to maintain the ends of the floaters in alignment, they are also preferably provided with the interfitting portions 17, as indicated in Fig. 4, one block having a recess to receive a projection on the end of the opposing floater. Due to the convection currents in the glass, as indicated by the arrows in Fig. 2, the floaters will be held against the side walls of the tank without the use of hooks or other securing devices for accomplishing this purpose. It will be seen that the floaters protect the top row of blocks 5 from the erosive and corrosive effects of the glass so that such blocks will require replacement at no more frequent intervals than the rows of blocks 6, 7 and 8. The floaters will, of course, be eaten away at the level of the glass, and must be replaced from time to time, but the replacement of these floaters does not require a shut down of the furnace and the cost of replacing the floaters is much less than the cost of replacing the top row of blocks 5. They are removed one by one through the openings 15, 15, after which new floaters are inserted and moved into position. The lugs 16 tend to stick to the blocks 5, but the floaters may be easily pried loose by means of a suitable tool inserted through the opening 18 (Fig. 3), such opening being closed by the removable wedge shaped blocks during the operation of the tank.

Figs. 6 and 7 illustrate modifications in the means for interlocking the floaters at their ends so as to prevent any relative lateral movement.

Each floater of the Fig. 6 construction is provided at one end with a recess 19 into which fits the bulb-shaped lug 20 at the end of the adjacent floater. In the Fig. 7 construction, the floaters have interlocking hook-shaped ends 21 and 22.

Figs. 8 and 9 illustrate still another method of securing the ends of the floaters together. In this construction an upstanding lug 23 is provided at the end of each floater and over these lugs is fitted a clay ring 24 which acts as a locking means.

If desired, the floaters may be held in place by hooks 25 (Fig. 1) carried by the side walls of the tank, as shown in the Baudoux and Gobbe patent, heretofore referred to, but they are preferably left free, as shown, as this simplifies the construction, and lessens the labor in removing and replacing the floaters. It also tends to keep the floaters from sticking to the walls, as changes in the level of the glass bath cause the floaters to free themselves by gravity.

What I claim is:

1. In combination with a glass melting tank, a protecting means for the upper row of blocks forming the wall of the tank comprising a series of floaters placed end to end and free to move vertically with respect to said wall, said floaters being provided with spaced projections on their inner sides adapted to engage the walls of the tank and thus maintain the body portions of the floaters out of contact with said wall.

2. In combination with a glass melting tank, a protecting means for the upper row of blocks forming the wall of the tank comprising a series of floaters placed end to end and free to move vertically with respect to said wall, and spacing means between the blocks and side walls for the tank for holding the floaters spaced from the wall of the tank.

3. In combination with a glass melting tank, a protecting means for the upper row of blocks forming the wall of the tank comprising a series of floaters placed end to end and free to move vertically with respect to said wall, means at the abutting ends of the blocks for securing such ends against relative lateral movement, and means for spacing the body portions of the floaters from contact with the wall of the tank.

4. In combination with a glass melting tank, a protecting means for the upper row of blocks forming the wall of the tank comprising a series of floaters placed end to end and free to move vertically with respect to said wall, said floaters being provided at their ends with projections for engaging the wall of the tanks so as to maintain the sides of the floaters below such projections out of contact with the wall of the tank.

CYRIL S. LINDER.